Oct. 1, 1968 E. A. ROBERTS 3,404,298

THERMALLY SENSITIVE COMPENSATING DEVICE

Filed Aug. 19, 1966 3 Sheets-Sheet 1

Inventor
Edward A. Roberts
By: Olson, Trexler, Wolters & Bushnell
Att'ys

THERMALLY SENSITIVE COMPENSATING DEVICE

Filed Aug. 19, 1966 3 Sheets-Sheet 2

Inventor
Edward A. Roberts
By: Olson, Trexler, Wolters & Bushnell Atty.

THERMALLY SENSITIVE COMPENSATING DEVICE

Filed Aug. 19, 1966 3 Sheets-Sheet 3

Inventor
Edward A. Roberts
By: Olson, Trexler, Wolters & Bushnell attys.

United States Patent Office 3,404,298
Patented Oct. 1, 1968

3,404,298
THERMALLY SENSITIVE COMPENSATING DEVICE

Edward A. Roberts, Lincolnwood, Ill., assignor to Kenton Engineering Corporation, Skokie, Ill., a corporation of Illinois

Filed Aug. 19, 1966, Ser. No. 573,574
6 Claims. (Cl. 310—8.9)

This invention relates generally to a temperature compensator and more particularly to a circuitry and method for applying thermally responsive reactive compensation to frequency control crystals to achieve stabilization of a resonant frequency of a circuitry over a broad range of temperatures.

Many types of communication equipment use quartz crystals to control constant frequency oscillators. A predetermined resonant frequency of the quartz crystal must be maintained within close tolerances if the constant frequency oscillator is to operate satisfactorily. However, the resonant frequency of a quartz crystal varies with changes in temperature of the crystal. Therefore, when a quartz crystal frequency control unit is used in an environment wherein the temperature varies, the resonant frequency of the control unit also varies. Since the control unit is used in constant frequency oscillators for communications and other purposes, it is essential that the resonant frequency of the quartz crystal frequency control unit be as stable as possible.

The prior art solution to the problem of eliminating variations in the resonant frequency of a quartz crystal control unit with variations in temperature consists mainly of maintaining the temperature of the control unit constant. Thus, heating devices or ovens are commonly used with the quartz crystal control units to maintain the quartz crystals at a constant temperature. However, these heating devices or ovens are not particularly satisfactory, due to the power which they consume and the time which they require to warm up. The heating devices are particularly unsatisfactory for use in portable communication units.

Therefore, it is an object of this invention to provide a compact temperature compensating unit for a quartz crystal control unit to maintain a constant control unit resonant frequency over a wide range of temperatures.

Another object of this invention is to provide a thermally responsive transducer for stabilizing resonant frequency of electrical circuitry over a broad range of temperatures.

Another object of this invention is to provide a rugged shock resistant temperature compensating unit for a quartz crystal.

Another object of this invention is to provide a variable reactance means for maintaining a constant resonant frequency for a circuitry including a crystal means whose resonant frequency varies with the temperature.

These and other objects and features of the invention will become more apparent upon a reading of the following detailed description taken in connection with the accompanying drawings, wherein.

As previously indicated, the resonant frequency of a crystal shifts as a function of variation in temperature. The resonant frequency shift of a crystal is not a linear function which varies directly with temperature. The resonant frequency-temperature shift characteristic commonly forms a generally S-shaped curve. Therefore, the shift in resonant frequency of a crystal must be compensated for by a non-linear thermal compensator. Since the resonant frequency of a circuit is a function of the reactance in the circuit, shifts in the resonant frequency of a crystal can be compensated for with either an inductive or capacitative reactance connected in a circuit with the crystal to compensate for the shift in resonant frequency of the crystal that occurs as a function of temperature.

Figures 1, 2, 3, 4, 5, 6:
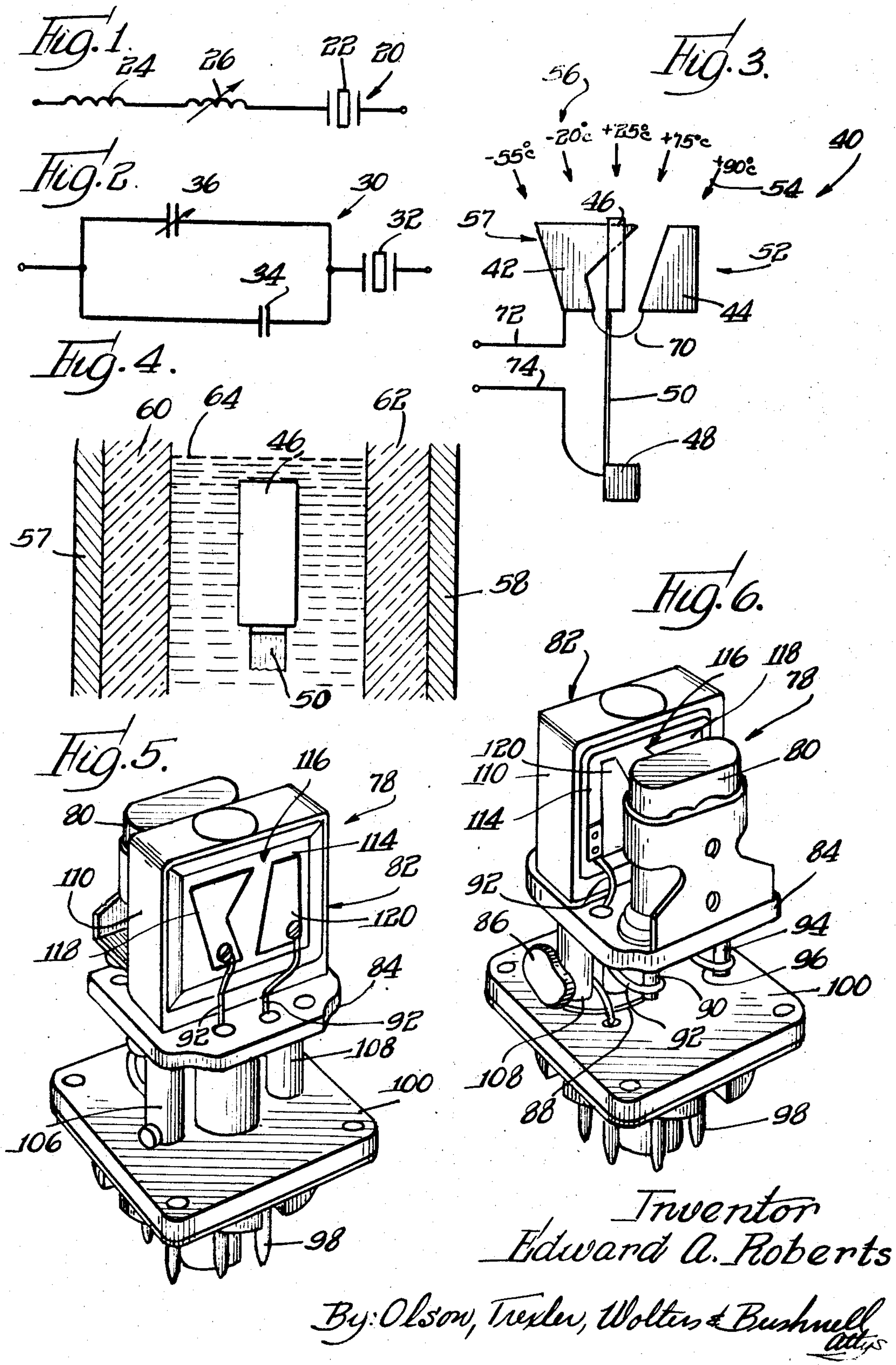
FIG. 1 is a schematic illustration of a circuitry having a variable inductance to compensate for a shift in resonant frequency of a crystal with changes in temperature.
FIG. 2 is a schematic illustration of a preferred circuitry utilizing a variable capacitance to compensate for a shift in resonant frequency of a crystal with changes in temperature.
FIG. 3 is a schematic illustration of a thermal compensator or transducer for varying the capacitance of a circuit as a function of changes in temperature of the thermal compensator.
FIG. 4 is a schematic illustration showing the relationship between a rotor of a variable capacitor and a pair of stator plates with the spacing between the rotor and stator plates exaggerated for purposes of clarity of illustration.
FIG. 5 is a perspective view of a preferred embodiment of a control circuitry including a crystal and a thermally responsive compensator for offsetting changes in resonant frequency of the crystal with changes in temperature to maintain the resonant frequency of the circuitry substantially constant over a range of temperatures.
FIG. 6 is a rear perspective view of the control circuitry of FIG. 5.

A circuitry 20 is schematically illustrated in FIG. 1. The circuitry 20 includes a crystal 22 which is connected in series with a fixed inductance 24 and a variable inductance 26. By adjusting the variable inductance 26 the resonant frequency of the circuitry 20 can be altered. If the value of the inductance 26 is adjusted as a function of the frequency-temperature shifts in resonant frequency of the crystal 22 with the changes in temperature, the inductance 26 can compensate for the changes in resonant frequency of the crystal 22 to maintain the resonant frequency of the circuitry 20 constant. However, as previously mentioned, the resonant frequency-temperature shift characteristics of the crystal 20 is generally S-shaped and non-linear. Since most thermally responsive elements respond linearly with changes in temperature, it is difficult to adjust the variable inductance 26 to follow the complex S-shaped frequency-temperature shift characteristics of the crystal 20. In addition, since the frequency-temperature shift characteristics of crystals vary, even between crystals that are specified to be alike, the adjustment of the variable inductance 26 must be made to accommodate a particular crystal with which the inductance is associated.

In FIG. 2 a preferred circuitry 30 is schematically illustrated wherein a crystal 32 is connected in series with a fixed capacitance 34 and a variable capacitor 36. By adjusting the variable capacitor 36 as a function of the temperature-frequency shift characteristics of the crystal 32, the variable capacitor 36 alters the reactance of the circuitry 30 to maintain the resonant frequency of the circuitry constant even though the resonant frequency of the crystal 32 varies with changes in temperature. The plates of the variable capacitor 36 can be readily shaped to follow the S-type frequency-temperature shift characteristic curve of the crystal 32 to provide the required compensation, even with a linear adjustment of the capacitor 36 as a function of changes in temperature. Therefore, a variable capacitor having shaped stator plates and a rotor which is moved linearly relative to the shaped stator plates by a thermally responsive drive means is preferred for maintaining the resonant frequency of the circuitry 30 constant with changes in temperature. In addition, by making the fixed capacitor relatively large, the circuitry 30 can be tightly coupled in an oscillator circuit. Also, stray capacitance and other circuit instabilities have relatively little effect upon the circuitry 30 when the value of the fixed capacitor 34 is relatively large.

Referring now to FIG. 3, a schematic drawing of a thermally responsive compensator or transducer 40 has been illustrated. The thermally responsive compensator 40 includes a pair of shaped stator sections 42 and 44 mounted in a fixed coplanar relationship. A rotor 46 is connected to a base 48 by a bimetallic drive element or strip 50. The shaped stator sections 42 and 44, and the rotor 46 form a variable capacitor 52. The bimetallic drive element 50 is linearly responsive to changes in temperature to move the rotor 46 relative to the fixed stator sections 42 and 44 as a direct function of temperature change. Thus, the rotor 46 is aligned, by the drive element 50, with indicator arrows 54 which are associated with temperature indicia 56 corresponding to the temperature of the thermally responsive compensator 40.

In view of the preceding description, it will be apparent that the thermally responsive compensator or transducer 40 is made up of a variable capacitor 52 having fixed shaped stator sections 42 and 44 and a rotor 46 connected to a thermally responsive drive means or bimetallic strip 50. The thermally responsive bimetallic strip 50 also serves as a conductor for the moving plate or rotor 46 of the variable capacitor 52.

Although a bimetallic cantilevered drive strip 50 is used in a preferred embodiment of the invention, it should be noted that a spiral configuration provides a greater deflection or movement of the rotor 46 which changes in temperature. This advantage of a spiral configuration for the bimetallic drive strip is more than offset by the difficulty in fabricating a spiral strip which consistently reproduces the necessary linear rotation of the rotor 46 as a function of changes in temperature. Furthermore, a spiral element is affected by gravational forces in both a direction normal to its axis and in an axial direction. A U-shape or L-shape is the next most efficient configuration for the bimetallic drive strip. However, such a U-shape or L-shape is difficult to fabricate and it is subject to being twisted by gravitational forces. Therefore, the bimetallic cantilevered strip 50 is preferred since it is the simplest configuration to fabricate and is affected only by gravitational forces normal to its flat surface which have relatively little effect on the pivoting or rotating movement of the rotor 46 relative to the stator sections 42 and 44. The temperature sensitivity of the bimetallic cantilevered strip 50 can be made to approach that of a more complex strip configuration for driving the rotor 46 by increasing its active length or reducing its thickness. After a certain length, the increased sensitivity is more than offset by the increased susceptibility of the thin bimetallic strip to vibration and shock loading. The main consideration in fabricating the bimetallic drive strip 50, and selecting the metals from which it is formed, is the temperature responsiveness of the metals in a temperature range in which the compensator crystal is to be used.

Referring now to FIG. 4, taken in conjunction with FIG. 3, the thermally responsive compensator 40 includes a pair of spaced-apart substantially parallel stator plates 57 and 58 which are each formed to two sections 42 and 44. The stator plates 57 and 58 are mirror images of each other and are mounted on ceramic dielectric plates or windows 60 and 62. The rotor 46 is mounted intermediate the stator plates 57 and 58 in a silicone damping fluid 64. The silicone fluid also acts as a dielectric medium which greatly increases the capacitance of the capacitor 52 by eliminating an air gap between the rotor 46 and stator plates 57 and 58. In addition, the silicone fluid provides an efficient heat transfer medium providing heat conduction between an outer casing of the compensator and the bimetallic strip 50. The silicone fluid also acts as a lubricant facilitating movement of the rotor 46 relative to the stator plates 57 and 58.

The stator plates 57 and 58 are each made of two sections 42 and 44. The two stator plates are, as previously mentioned, mirror images of each other. The capacitance which is present at any given time is directly proportional to the area of the rotor 46 which is projected onto the sections 42 and 44 of the stator plates. The two shaped stator sections 42 and 44 are interconnected by a lead 70 (see FIG. 3) to combine the capacitance of each of the sections. By altering the shape and configuration of the sections 42 and 44 of the stator plates 57 and 58, the change in capacitance with movement of the rotor 46 relative to the stator plates can be altered to suit the frequency-temperature shift characteristics of any desired crystal. The thermal compensator 40 is connected to a circuitry by a lead 72 which is connected to one of the sections 42 of the stator plate 57 and a lead 74 which is connected to the bimetallic strip 50 and the rotor 46. Of course, there is another lead, similar to the lead 72, from the section 42 of the stator plate 58.

A control circuitry or unit 78 for use in a constant frequency oscillator is illustrated in FIGS. 5 and 6. The control circuitry 78 includes a crystal unit 80 which is mounted adjacent to a thermally responsive compensator or transducer 82 on a base 84. The thermal compensator or transducer 82 is similar in structure to the thermal compensator 40 of FIG. 3 and is connected to a fixed value capacitor 86, which corresponds to the capacitor 34 of FIG. 2. The capacitor 86 is also connected by a lead 88 (see FIG. 6) to one terminal 90 of the crystal unit 80. The terminal 90 is also connected by leads 92 to the stator sections of the thermal compensator 82. A second terminal 94 of the crystal unit 80 is connected by a lead 96 to a prong of a plug 98 which is secured to a mounting plate 100. The rotor of the thermal compensator 82 is connected to a second prong of the plug 98. It will be apparent to those skilled in the art that by means of the aforementioned connections, the circuit of FIG. 2 is formed by the control circuitry 78 with the crystal unit 80 corresponding to the crystal 32 of FIG. 2, the thermal compensator 82 corresponding to the variable capacitor 36 of FIG. 2, and the fixed value capacitor 86 corresponding to the fixed capacitor 34 of FIG. 2.

The base 84, of the control circuitry 78, is connected to the mounting plate 100 by means of a pair of nylon spacer supports 106 and 108. The supports 106 and 108 are connected by studs to a housing 110 of the thermal compensator 82. The spacers 106 and 108 position the base 84 relative to the mounting plate 100. The resilient nylon spacers 106 and 108 absorb vibrations and prevent the crystal unit 80 and thermal compensator 82 from being damaged by shock loading.

Figures 7, 8, 9:
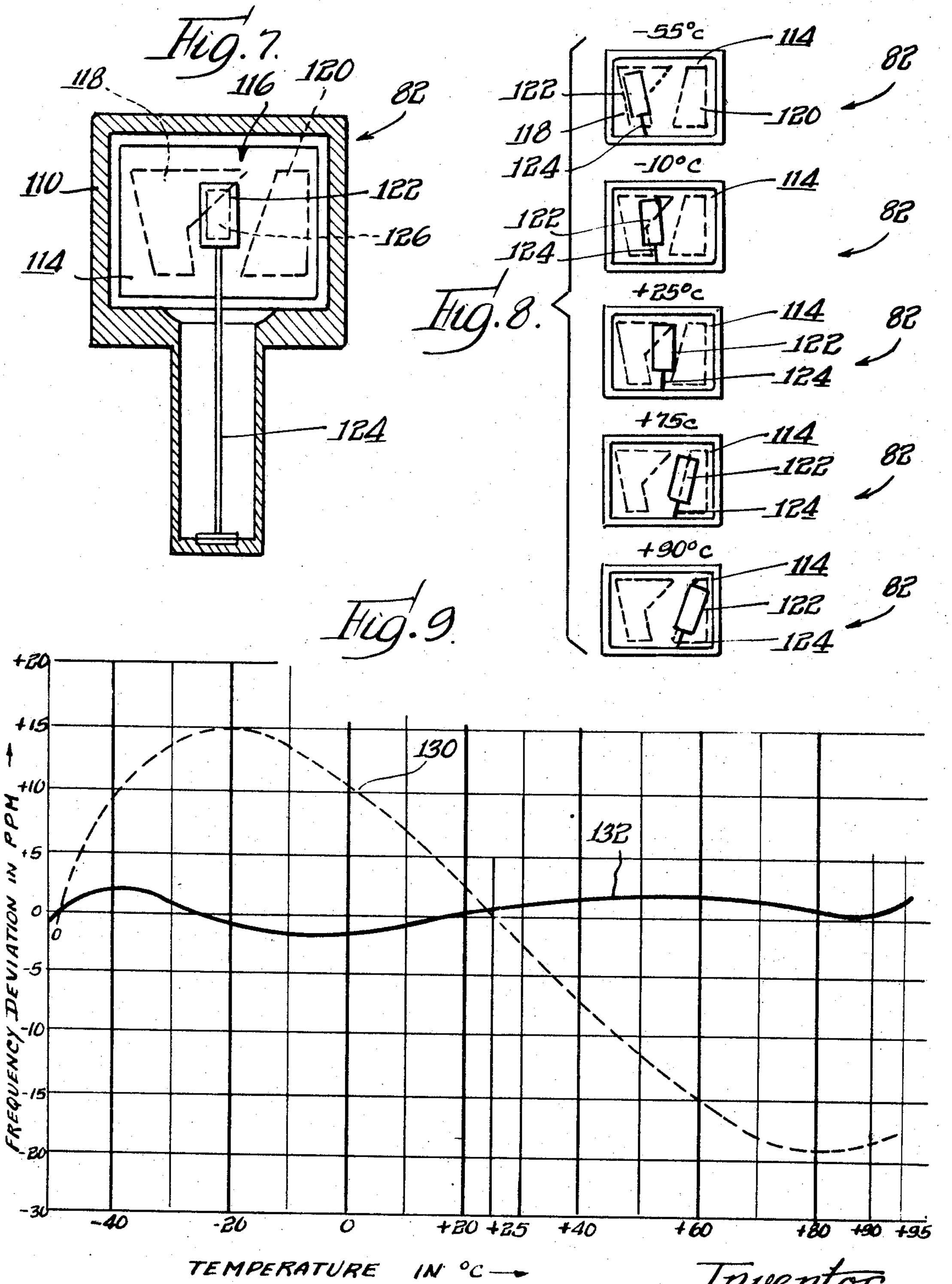
FIG. 7 is an enlarged sectional view of a thermal compensator or transducer used in the control circuitry of FIGS. 5 and 6.
FIG. 8 is a schematic illustration of the relationship of a rotor in the thermal compensator of FIG. 7 relative to sections of a shaped stator plate.
FIG. 9 is a graph showing the deviation of resonant frequency of a illustrative uncompensated crystal as opposed to the resonant frequency deviation of a circuitry including the same crystal and an illustrative thermal compensator or transducer.

The structure of the thermal compensator or transducer 82 is illustrated in detail in FIG. 7, taken in conjunction with FIGS. 5 and 6. The housing 110 of the thermal compensator 82 is advantageously formed of a metal which has substantially the same coefficient of expansion as do a pair of parallel spaced-apart ceramic dielectric plates 114 which are mounted in rectangular apertures on opposite sides of the housing 110. The dielectric plates 114 support stators 116 which are mirror images of each other and have a pair of electrically interconnected shaped sections 118 and 120, similar to the shaped stator sections 42 and 44 of FIG. 3. A rotor 122 is mounted on a thermally responsive bimetallic drive strip 124 for movement relative to the stators 116. By experimentation it has been determined that a housing 110 of a nickel-cobalt-iron alloy, such as Kovar, has substantially the same coefficient of expansion as do dielectric plates of either alumina or titanium dioxide ceramic materials. It has also been determined that the dielectric plates, when made of an alumina dioxide ceramic material, can advantageously be metallized and connected with a rigid solder seal to the housing 110. Thermal expansion and contraction of a silicone dielectric fluid, with which the housing 110 is filled, is facilitated by the provision of an air bubble in the housing 110.

The bimetallic drive strip 124 is fabricated to provide a high degree of sensitivity with a temperature range in which the compensator is to be used. The bimetal "Morflex" has been found to be particularly satisfactory for use in temperature ranges of minus fifty-five degrees centigrade to plus ninety degrees centigrade. A sealed air chamber 126 can advantageously be provided in the rotor 122 to increase the thermal responsiveness of the rotor 122, and bimetallic drive strip 124 which drives the rotor, by reducing the weight of the rotor and increasing the buoyant force exerted on the rotor by the silicone dielectric fluid with which the housing 110 is filled.

The stator sections 118 and 120 must be shaped to provide the necessary change in capacitance to offset frequency-temperature shifts in resonant frequency of the particular crystal with which the compensator unit 82 is associated. Since the frequency-temperature shift characteristics of crystals are different, the thermal compensator 82 is fabricated with tentatively shaped stator sections 118 and 120. The stator sections 118 and 120 are advantageously formed with a conductive silver lacquer. The lacquer dries at room temperatures and can be easily removed and reapplied as the shape of the stator sections 118 and 120 is experimentally adjusted to the particular frequency-temperature shift characteristics of the associated crystal.

The final shape of the stator sections 118 and 120 must, due to the variations in frequency-temperature shift characteristics of crystals, be formed on an experimental trial and error basis. The final shape of the stator sections 118 and 120 is also a function of the thermal responsiveness of the bimetallic strip 124 which drives the rotor 122 relative to the stator sections 118 and 120 as a function of changes in temperature. Therefore, the shape of the stator sections 118 and 120 is a function of both the frequency-temperature shift characteristics of the associated crystal and the thermal responsiveness of the bimetallic drive strip 124.

As is perhaps best seen in FIG. 8, the rotor 122 is rotated or pivoted relative to the stator plates by the bimetallic drive strip as the temperature of the thermal compensator 82 changes. Thus, with the thermal compensator design illustrated in FIG. 8, the rotor pivots from a position at the left of the thermal compensator at a temperature of minus 55 degrees centigrade, to the center of the thermal compensator at a plus 25 degrees centigrade, and finally over to the far right at a temperature of plus 90 degrees centigrade. The amount of rotation of the rotor is, as previously explained, a function of the materials from which the bimetallic drive strip 124 is fabricated and the length of the bimetallic drive strip.

Referring now to FIG. 9 in which a curve 130 of the uncompensated resonant frequency-temperature shift characteristics of an illustrative crystal is shown. It should be noted that the curve 130 is merely an illustrative example and that the resonant frequency-temperature characteristics of crystals vary considerably depending upon the material from which the crystal is made and the cut of the crystal. The curve 130 goes from a maximum positive deviation of fifteen parts per million in the resonant frequency of an uncompensated crystal at minus twenty degrees centigrade, to a maximum negative deviation of approximately minus twenty parts per million, at plus eighty degrees centigrade. Although the slope of the curve and the values illustrated in FIG. 9 will not hold true for all crystals, the frequency-temperature shift characteristics for most uncompensated crystals resemble the general S-shape of the curve 130.

A curve 132 is shown for a thermally compensated control circuitry, similar to the circuitry 78 of FIGS. 5 and 6, utilizing the crystal whose uncompensated resonant frequency-temperature shift characteristics are illustrated by the curve 130. The thermal compensator 82 varies the reactance of the circuitry to maintain the resonant frequency of the circuitry substantially constant even though the resonant frequency of the crystal shifts, as illustrated by the curve 130, with changes in temperature. It should be noted that the curve 132, for the thermally compensated control circuitry, shows a frequency-temperature shift deviation from the predetermined original resonant frequency (i.e. zero frequency deviation) of approximately two parts per million both positive and negative. Therefore, by using the thermal compensator 82 with the crystal, the deviation in resonant frequency is held to a range of approximately four p.p.m. while an uncompensated crystal has a range of resonant frequency deviation of approximately 35 p.p.m.

As previously mentioned, the curves 130 and 132 are illustrative of the results obtained by using a particular thermal compensator 82 with a particular crystal. Since the sections 118 and 120 of the stator plates 116 are shaped by trial and error to the characteristics of a given crystal, the results obtained by using a particular thermal compensator 82 with a particular crystal depends in part upon the care with which the sections 118 and 120 of the stator plates 116 are shaped. The slope or rate of change of the resonant frequency-temperature shift characteristic curve 130 for a particular crystal also affects the results obtained with the thermal compensator 82. Thus, the effectiveness of the thermal compensator 82 also varies with the frequency-temperature deviation characteristics of the particular crystal with which the thermal compensator is associated. If the resonant frequency-temperature deviation curve for a crystal has a steep slope, that is a relatively large deviation from resonant frequency for a relatively small change in temperature, the thermal compensator 82 must make a relatively large change in the reactance of the control circuitry 78 for a relatively small change in temperature. It has been determined, by experimentation, that the compensator 82 yields the best results when associated with a crystal having an uncompensated resonant frequency deviation curve 130 having a maximum slope of less than 0.8 part per million per degree centigrade.

Another factor which has a substantial effect on the effectiveness of the thermal compensator 82 is the thermal inertia or rate of response of the thermal compensator. The rate of conduction of heat determines the rate of response of the thermal compensator with changes in temperature. Since most crystals are highly responsive to changes in temperature, the crystal unit 80 usually responds to temperature changes at a greater rate than does the thermal compensator 82. Thus, unless the rate of temperature response of the thermal compensator 82 is approximately the same as that of the crystal unit 80, if the temperature changes rather quickly the resonant frequency of the circuitry 78 may vary during the time in which the thermal compensator 82 is reacting. With rapid changes in temperature, the resonant frequency of the circuitry 78 can vary severely, perhaps to an extent greater than even that of the uncompensated crystal unit, while the thermal inertia of the compensator 82 is being overcome. To equalize the rate of thermal response of the compensator 82 and the crystal unit 80, the entire circuitry 78 is advantageously sealed in an evacuated glass holder which, due to its insulating qualities, retards the rate of temperature change of both the crystal unit 80 and the thermal compensator 82.

For purposes of affording a more complete understanding of the invention, it is advantageous now to provide a functional description of the mode in which the parts thus far identified cooperate. Crystals having a resonant frequency which shifts with variations in temperature are commonly utilized in constant frequency oscillator circuits. The changes in resonant frequency of the crystal can be offset by means of a variable reactance. As illustrated in FIG. 1, a variable inductive reactance can be used in a circuitry to offset deviations in the resonant frequency of a crystal 22. However, it is preferred to utilize a variable capacitative reactance, similar to the capacitance 36 of FIG. 2 to offset the frequency-temperature shift characteristics of a crystal. The amount of capacitance in the circuitry is altered by a thermally responsive drive means or bimetallic strip 50 which is connected to a rotor 46 of the variable capacitor 52 of FIGS. 3 and 4. The variable capacitor 52 includes two parallel spaced-apart stator plates 57 and 58 which are made up of shaped sections 42 and 44 which are electrically interconnected. The position of the rotor 46 relative to the shaped sections 42 and 44 of the capacitor 50 will determine the amount of capacitance in a circuit. The position of the rotor 46 relative to the sections 42 and 44 is changed as a linear function of temperature by the thermally responsive bimetallic drive strip 50. The drive strip 50 swings the rotor 46 in a silicone dielectric dampening fluid 64 to a predetermined position which is a function of the temperature of the thermally responsive compensator or transducer 40. The output from the variable capacitor 52 is connected over the leads 72 and 74 to a crystal.

In FIGS. 5 and 6 a control circuitry 78 is shown utilizing a thermal compensator 82, constructed in a manner similar to the thermal compensator 40 of FIGS. 3 and 4, to offset deviations in the resonant frequency of a crystal unit 80 with changes in temperature. The thermal compensator 82 is connected in series to the crystal 32, as illustrated in FIG. 2. By altering the the reactance in the circuitry 78 as a function of the ambient temperature and the frequency-temperature shift characteristics of the crystal unit 80, the thermal compensator 82 maintains the resonant frequency for the circuitry 78 substantially constant, as shown by the curve 132 of FIG. 9 for an illustrative circuitry. Although the thermal compensator has been illustrated connected in series with the crystal unit 80, it will be apparent to those skilled in the art that the thermal compensator 82 could advantageously be connected in parallel with the crystal unit 80 when, for example, antiresonant operation of an oscillator circuit is desired.

Figure 10:
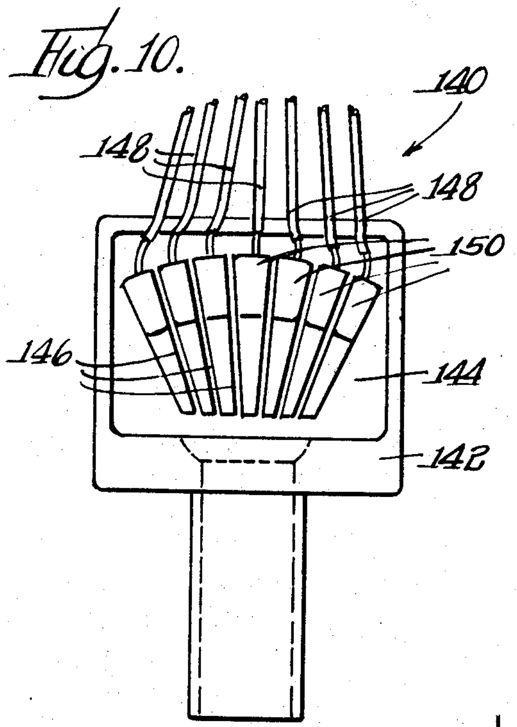
FIG. 10 is a plan view of a thermal compensator or transducer, which is used in a second embodiment of the invention, wherein a plurality of stator sections are connected to a plurality of variable capacitors.
Figure 11:
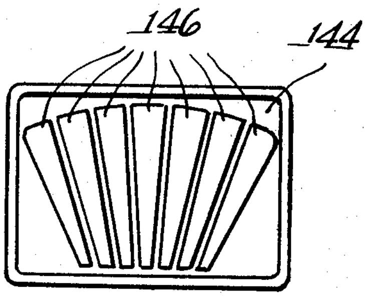
FIG. 11 is a plan view of a dielectric plate and stator sections used in the embodiment of the thermal compensator illustrated in FIG. 10.
Figure 12:
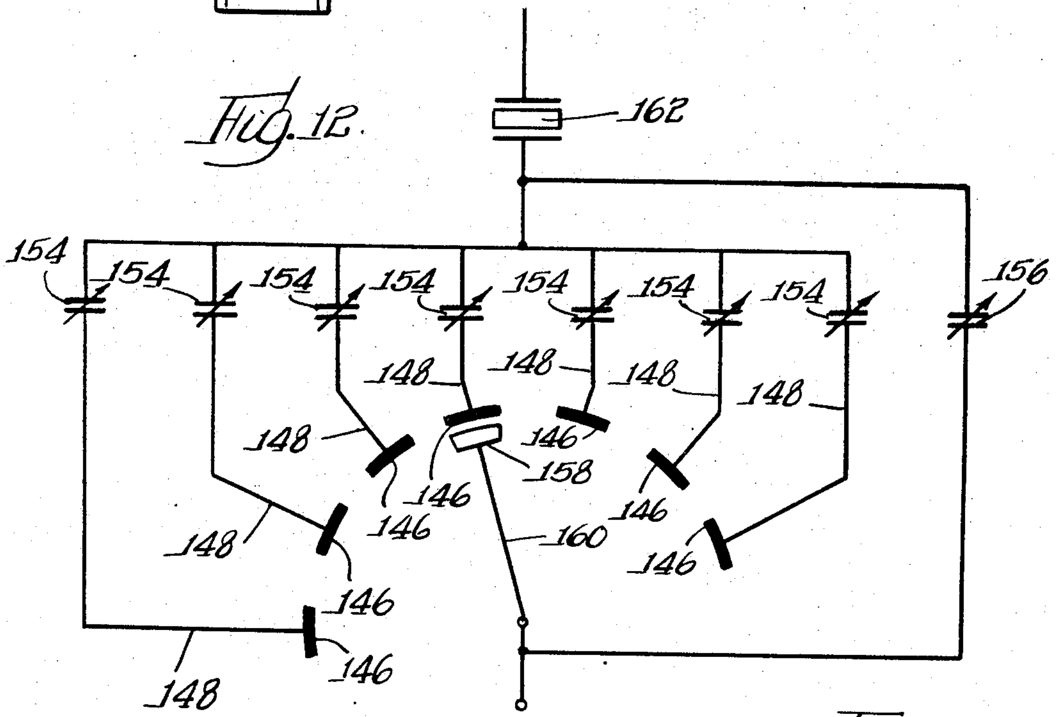
FIG. 12 is a schematic illustration showing the relationship between the stator sections and variable capacitors used with the embodiment of FIG. 10.

A thermal compensator or transducer 140 is illustrated in FIGS. 10 through 12. The thermal compensator 140 is constructed in much the same manner as the thermal compensator 82 of FIGS. 5 and 6. The thermal compensator 140 includes a housing 142 in which a pair of ceramic dielectric stator plates 144 are mounted in a spaced-apart parallel relationship in apertures in the housing 142. A plurality of stator sections 146 are formed on the ceramic plates 144 by a conductive silver-glass frit metallizing composition which is applied to the stator plates 144 through a silk screen having a pattern similar to the shape of the stator sections 146 (see FIG. 11). The coating is thoroughly baked in a furnace to securely bond the sections 146 to the plates 144. Of course, other methods of forming the section 146 could be used. The silver stator sections 146 are electro-plated with a flash coat of copper to enable lead wires 148 to be soldered at 150 to the sections 146 without oxidizing the silvered sections. The thermal compensator or transducer 140 is constructed with a rotor which is movable relative to the stator sections 146 by a bimetallic strip, in much the same manner as in the thermal compensator 82 of FIGS. 5 and 6. Thus, the thermal compensator 140 is substantially the same as the thermal compensator 82, except for the construction of the stator plates 144.

The wires 148, which are connected to the stator sections 146, are connected to a plurality of variable capacitors 154, as indicated schematically in FIG. 12. The capacitance associated with an individual stator section 146 can be selectively varied by adjusting the capacitors 154. The capacitors 154 are adjustable over a wide range and can be completely opened to provide zero capacitance and short circuited to provide infinite capacitance. A variable capacitor 156 is connected in parallel with the capacitors 154 for the same purpose as previously explained for the fixed capacitor 34 of FIG. 2.

A rotor 158 is pivoted relative to the stator sections 146 by a thermally responsive bimetallic drive strip 160 to alter the reactance in series with a crystal 162. The variable capacitors 154 can be adjusted to alter the reactance in the circuitry as a function of the frequency-temperature shift characteristics of the crystal 162 and the thermally responsive characteristics of the bimetallic drive strip 160 to maintain the resonant frequency of the circuitry substantially constant. By the use of the variable capacitors 154 and 156, the thermal compensator 140 can be easily adjusted to match the frequency-temperature shift characteristics of many different crystals. This ability to adjust the capacitance of the thermal compensator 140 eliminates the necessity for a trial and error shaping of the stator plates as is required by the structure of the thermal compensator 82 of FIGS. 5 and 6. By adjusting the capacitors 154 and 156 the thermal compensator maintains the resonant frequency of the circuitry substantially constant with crystals having different characteristics. In practice, it has been found to be advantageous to adjust the capacitors 154 at temperature intervals of approximately thirty degrees centigrade. In addition, the thermal compensator 140 can, if desired, be made on a large production basis and combined with crystals having many different frequency-temperature shift characteristics. Of course, a large production of the thermal compensator 140 would result in the use of known manufacturing processes different than those set forth herein.

The manner in which the present invention may be practiced and the purpose to which it may be put are evident from the foregoing descriptions. However, for purposes of affording a more complete understanding of the invention, it is advantageous now to provide a functional description of the mode in which the component parts cooperate. Control circuitry utilizing crystals whose resonant frequency varies with changes in temperature are commonly utilized in constant frequency oscillators. The resonant frequency of the control circuitry is maintained constant over a large range of temperatures by means of a thermally responsive transducer or compensator. The transducer or compensator varies the reactance in the circuitry as a function of the frequency-temperature shift characteristics of the crystal to maintain the resonant frequency for the control circuitry constant even though the resonant frequency of the crystal changes with temperature. Although the reactance in the circuitry can be altered by means of a variable inductance (see FIG. 1) it is preferred to utilize a variable capacitance in series with the crystal, as illustrated in FIG. 2. The variable capacitance 52 (see FIG. 3) advantageously includes a stator plate 57 which is made up of a pair of shaped sections 42 and 44. A rotor 46 is moved relative to the stator plate and the sections 42 and 44 by a bimetallic thermally responsive strip 50. Of course, the capacitance in the circuitry is varied as a function of the area of the rotor 46 which projects on the shaped sections 42 and 44.

A first embodiment of the control circuitry is illustrated in FIGS. 5 and 6 wherein a circuitry 78 includes a crystal unit 80 and a thermally responsive transducer or compensator 82 which is connected in series with the crystal unit 80. The thermal compensator 82 includes a rotor 122 which is mounted for movement in a metallic housing 110 having a pair of parallel stator plates 114 and shaped stator sections 118 and 120. The thermal compensator 82 will maintain the resonant frequency of the circuitry 78 substantially constant, as illustrated by the exemplary curve 132 of FIG. 9. Therefore, by varying the reactance of the circuitry 78, the thermal compensator or transducer 82 maintains the resonant frequency of the circuitry constant although the resonant frequency of the crystal unit 80 varies with changes in the temperature, as indicated by the exemplary curve 130 of FIG. 9.

The sections 118 and 120 of the stator plates in the thermal compensator 82 must be shaped by trial and error to conform to the frequency-temperature shift characteristics of the crystal unit 80 and the thermal response characteristics of the bimetallic strip 124. The necessity for the trial and error shaping of the stator sections is eliminated with the thermal compensator 140 (see FIGS. 10 through 12) which has a plurality of uniform stator sections which are connected to a series of separate variable capacitors. By adjusting the capacitance associated with each of the stator sections 146, the thermal compensator 140 will compensate for the shift in resonant frequency of a crystal 162 with changes in temperature. Since the variable capacitors 154 may be adjusted to match the frequency-temperature characteristics of most commonly used crystals, the need for an experimental trial and error shaping of the stator plates is eliminated.

Although a bimetallic strip has been utilized as a thermally responsive drive means in the preferred embodiments of the thermal compensator, it is contemplated that a gas filled tube or bellows could be used as a drive means. It is also contemplated that both the capacitative and inductive reactance of a control circuitry could be altered contemporaneously to maintain the resonant frequency of the control circuitry constant with a thermal shift in the resonant frequency of an associated crystal circuitry. Therefore, while particular embodiments of the invention have been shown, it should be understood, of course, that the invention is not limited thereto, since many modifications may be made, and it is contemplated to cover by the appended claims any such modifications as fall within the true spirit and scope of the invention.

What is claimed is:

1. Apparatus comprising electrical circuitry having a resonant frequency which varies with variations in temperature of said circuitry, a thermally responsive transducer means connected to said electrical circuitry for offsetting the variations on the resonant frequency with variations in the temperature of said electrical circuitry, said transducer includes a variable capacitor having a plurality of shaped plates with a stator configuration which is a function of variations in the resonant frequency of said electrical circuitry, and a thermally responsive rotor means intermediate to said shaped plates for altering the capacitance of said variable capacitor as a function of changes in the temperature of said transducers means.

2. Electrical circuitry comprising; crystal means having a resonant frequency which changes with variations in temperature of said crystal means, variable reactance means electrically connected to said crystal means, said variable reactance means includes a plurality of coplanar stator sections, a thermal responsive rotor section for movement relative thereto as a function of changes in temperature of said rotor means; and a variable capacitor means connected to each of said stator sections, said variable capacitor means being adjustable to selectively alter the capacitance associated with a stator section to compensate for changes in the resonant frequency of said crystal means with changes in temperature.

3. Apparatus as set forth in claim 1 wherein: said variable capacitor means includes a plurality of stator sections at least some of which are electrically connected to selectively adjustable capacitor means for altering the reactance of an associated stator.

4. Apparatus as set forth in claim 1 wherein: said electrical circuitry includes a crystal means, the resonant frequency of said crystal means changing with variations of the temperature of said crystal means; and said transducer means includes a variable capacitor means and a thermally responsive drive means connected to said variable capacitor means to alter the capacitance of said variable capacitor means as a function of the changes in resonant frequency of said crystal means with changes in temperature to offset the changes in resonant frequency of said electrical circuitry.

5. Apparatus as set forth in claim 4 wherein: said variable capacitor means includes a plurality of shaped plates and a rotor means intermediate said shaped plates; said drive means includes a bimetallic member responsive to variations in temperature to move said rotor means relative to said shaped plates as a function of changes in temperature of said thermally responsive transducer means, said shaped plates having a configuration which is a function of both the variations in resonant frequency of said crystal means with variations in temperature and the thermal responsiveness of said bimetallic member.

6. Apparatus as set forth in claim 3 wherein: said electrical circuitry includes crystal means, the resonant frequency of said crystal means changing with variations in temperature of said crystal means; and said transducer means includes variable capacitor means, said variable capacitor means including a plurality of stator sections, a rotor connected to a thermally responsive drive means for movement relative to said stator sections, and a plurality of adjustable capacitor means connected to at least some of said stator sections, each of said plurality of adjustable capacitor means being selectively adjustable to vary the capacitance associated with each of said stator sections to enable the reactance in said electrical circuitry to be varied as a function of the variations in resonant frequency of said crystal means with temperature.

References Cited

UNITED STATES PATENTS

| | | | |
|---|---|---|---|
| 2,073,459 | 3/1937 | Thurston | 310—8.9 |
| 1,994,228 | 3/1935 | Osnos | 310—8.9 |
| 2,470,738 | 5/1949 | Bach | 331—176 |
| 2,471,143 | 5/1949 | Cress | 310—8.9 |
| 2,515,083 | 7/1950 | Franklin | 310—8.9 |
| 2,607,818 | 8/1952 | Richards | 310—8.9 |
| 3,060,748 | 10/1962 | Schwartz | 310—8.9 |
| 3,185,869 | 5/1965 | Shoor | 310—8.4 |
| 3,327,533 | 6/1967 | Kooiman | 310—8.9 |

J. D. MILLER, *Primary Examiner.*